United States Patent
D'Andrea et al.

[19]

[11] Patent Number: 5,867,557
[45] Date of Patent: Feb. 2, 1999

[54] REMOTELY CONTROLLED COMMUNICATION LINE DIAGNOSTIC APPARATUS AND METHOD

[75] Inventors: Anthony G. D'Andrea, Johnston, R.I.; Claude A. Charland, Boisbriand, Canada

[73] Assignee: Texas Instruments Incorporated, Dallas, Tex.

[21] Appl. No.: 649,355

[22] Filed: May 17, 1996

[51] Int. Cl.⁶ ............................... H04M 1/24; H04M 3/08; H04M 3/22

[52] U.S. Cl. ................... 379/29; 379/1; 379/30; 370/241

[58] Field of Search .................. 379/1, 2, 8, 26, 379/27, 30, 31, 32, 29, 6; 370/241, 242, 248, 252

[56] References Cited

U.S. PATENT DOCUMENTS

| | | | |
|---|---|---|---|
| 4,807,277 | 2/1989 | Perry | 379/8 |
| 5,210,477 | 5/1993 | Rowlette et al. | |
| 5,604,785 | 2/1997 | Pryor et al. | 379/2 |

FOREIGN PATENT DOCUMENTS

WO 94/13090 6/1994 WIPO.

*Primary Examiner*—Curtis A. Kuntz
*Assistant Examiner*—Binh K. Tieu
*Attorney, Agent, or Firm*—Russell E. Baumann; Richard L. Donaldson; René E. Grossman

[57] ABSTRACT

A communication line diagnostic unit (10, 10') that allows telephone central office equipment to perform a test of a communication line and determine the ability of the line as a communication medium is shown. The device is completely passive and transparent during normal operation and responds only to a unique trigger signal generated from the central office verification controller (VC). The unit is powered from a capacitor storage element (C1) charged by the communication line through an AC coupling network (pins 11, 12 and 8) as well as through a DC network comprising voltage regulator device (Q2; Q23; Q24, Q25) when the unit is awakened. Upon receipt of the trigger signal the device responds as by disconnecting the subscriber apparatus and then providing certain electrical terminations through a single solid state switch (Q10) to allow for identification, loop resistance, noise and frequency response measurements. The unit proceeds with a preselected test sequence providing that enough energy is present on capacitor storage element (C1) prior to disconnecting the subscriber. The voltage of storage element (C1) is continually monitored and if it ever reaches a minimum energy amount required to reconnect the subscriber, the subscriber is reconnected and the test is aborted. The subscriber apparatus is disconnected by means of a latching relay (K1) in one embodiment and FET switches (Q12, Q13) in alternate embodiments.

44 Claims, 6 Drawing Sheets

REMOTELY CONTROLLED COMMUNICATION LINE DIAGNOSTIC APPARATUS AND METHOD

FIELD OF THE INVENTION

This invention relates generally to communication lines and more particularly to electronic apparatus for selectively altering the electrical condition of a communication line to allow a diagnostic routine to be performed on the communication line at a remote location.

BACKGROUND OF THE INVENTION

The need for reliable and accurate testing of communication lines and for distinguishing between problems existing on a subscriber side of a demarcation point and the telephone company on the opposite side of the demarcation point in a cost effective manner has become of ever increasing importance.

In published PCT patent application, International Publication No. WO 94/13090, published Jun. 9, 1994, apparatus and method for performing a diagnostic test cycle on a communication line from a central office is disclosed comprising a verification controller (VC) located at the central office and respective network termination units, each being located at the locus of a subscriber on the other side of a demarcation point between the telephone company and the respective subscriber. The verification controller is programmed to effect measurements in a timed relationship with an actuation sequence of switches in the network termination unit. Each network termination unit is connected in series with the tip and ring conductors and includes a switch module which establishes a network of electrical paths capable of altering the electrical condition of the communication line, a logic module controlling the operation of the switch module and a power module that accumulates an electric charge from voltage impressed across the tip and ring conductors of the line in order to power the logic module when the network termination unit is actuated. The power supply module also generates a clock signal at a predetermined frequency which regulates the operation of the logic module. The switch module includes a plurality of discrete switches comprising a tip switch for placement in series with the tip conductor, a ring switch for placement in series with the ring conductor, a tip to ground switch, a ring to ground switch, a short switch connected across the tip and ring conductors and a termination switch incorporating a known fixed impedance connected across the tip and ring conductors. Each switch is disclosed as a solid state semiconductor device which establishes a bi-stable electric path capable of assuming either a short circuit condition or an open circuit condition in response to an actuation signal generated by the logic module.

Although the network termination unit made in accordance with the above patent application is effective and accurate, it is larger in size and more expensive in cost than desirable for widespread application.

SUMMARY OF THE INVENTION

It is an object of the present invention to provide a compact, low cost network termination unit useful with the verification controller of PCT patent application, International Publication No. WO 94/13090, referenced supra.

Another object of the invention is to provide a relatively inexpensive, accurate and reliable apparatus as a remote demarcation device used to isolate subscriber equipment.

Yet another object is to provide a network termination unit useful in providing identification of the unit as well as in the measurement of selected electrical parameters of a communication line.

Briefly, in accordance with a preferred embodiment of the invention, the unit comprises series switches connected to the tip and ring conductors of a communication line at a subscriber's location which are normally of low impedance and which are switchable to high impedance upon proper recognition of a test sequence command in the form of a wake-up or trigger signal initiated by a verification controller (VC) located at the central office. The unit contains a power supply network connected to the line which normally remains at a high impedance between tip, ring and earth ground. Upon power up, the power supply network regulates a DC supply to a low voltage integrated circuit. A wake-up Detect Logic Section of the circuit, a high impedance on the line, continually monitors for the presence of a wake-up command of a selected code. Upon receipt of this code this section then initiates a command to a ROM and Control Logic Section to begin a given sequence. This section activates the other major sections of the device in the proper sequence in order to configure the line for a selected diagnostic test routine.

A shunt switch section is connected to tip, ring and earth ground and is normally a high impedance path. When operated it provides a predetermined low impedance on the line. By pulsing this switch at the beginning of the test sequence, the VC can recognize the presence of the unit and synchronize itself to the unit's sequencing clock. The shunt switch is also used by the VC in performing measurements of the sum of the tip and ring conductor resistance along with providing a known termination for noise measurements.

An earth ground connection is used to connect the tip and ring conductors to ground, allowing for a separate tip and ring conductor resistance measurement. One half of the difference between a tip and ring loop measurement and the sum of tip-to-earth and ring-to-earth, results in the ground's resistance value at the unit.

A Tone Generator Section, normally a high impedance to the line, when enabled utilizes the shunt switch and provides predetermined frequency signals on the line for measurement by the VC. The level and frequency are fixed, thereby allowing for a signal loss vs. frequency measurement by the VC.

An example of a selected full sequence comprises the following, opening the series switches, pulsing the shunt switch at a known rate; maintaining the shunt switch in high impedance for network line voltage and leakage measurements; activating the shunt switch for a tip-to-ring loop resistance measurement; activating the shunt switch for individual tip-to-earth and ring-to-earth resistance measurements; enabling the tone generator for a frequency response measurement; disabling the tone generator and activating the shunt switch for a noise measurement; disabling the shunt switch and reactivating the series switch to end the sequence.

The power supply network for the low voltage circuit includes a high voltage series regulator serially connected to one of the tip and ring conductors to regulate supply voltage to the circuit. The high voltage series regulator comprises an FET device in one embodiment and one or more bipolar transistors in alternate embodiments. In one embodiment an over-voltage protection circuit comprises a unidirectional surge protector having a break-over voltage less than the maximum voltage rating of the regulator along with a six diode bridge coupled to tip, ring and earth ground conductors. In another embodiment the bridge is modified to obviate the possibility of noise coming into the unit through ground.

In one preferred embodiment, the series switches comprise a double pole latching relay which maintains the unit normally transparent to the communication line. The relay is driven by a capacitor charged by several means including an AC coupling network with the tip, ring and earth ground conductors, a DC charge path from the high voltage series regulator of the power supply network including a voltage doubling network and, in the event of the relay being open when the circuit has not been awakened by a command or trigger signal, a high impedance path connected to the tip and ring conductors.

Alternative embodiments include series switches comprising depletion FET's and a bipolar transistor drive circuit, an alternate n-channel and p-channel enhancement MOSFET drive circuit and an alternate transformer drive circuit.

Additional objects and features of the invention will be set forth in part in the description which follows and in part will be obvious from the description. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention and, together with the description, serve to explain the objects, advantages and principles of the invention. In the drawings.

DETAILED DESCRIPTION OF PREFERRED EMBODIMENTS

Figure 1:
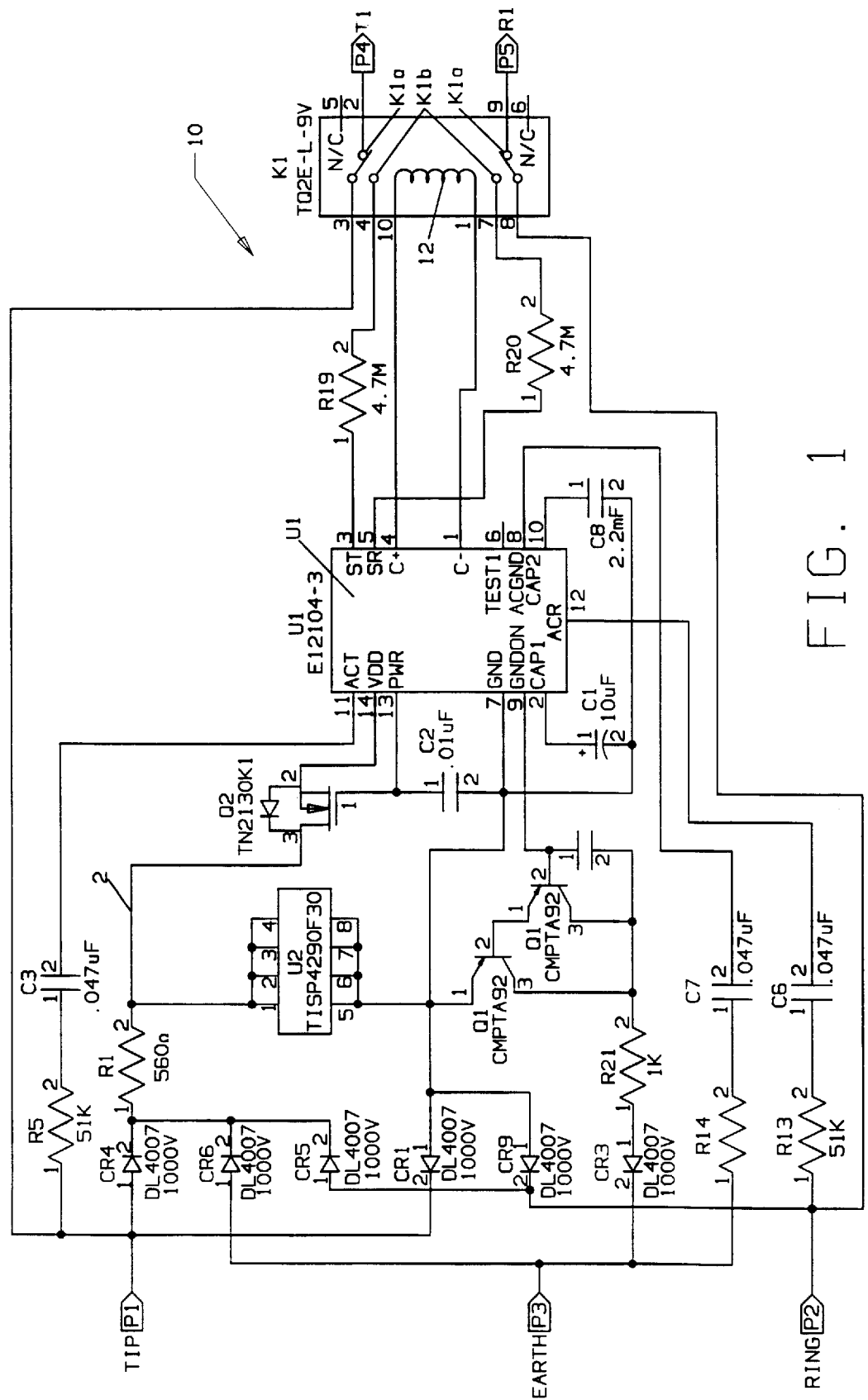
FIG. 1 is a schematic diagram of a network termination unit made in accordance with a first embodiment of the invention.
Figure 10:
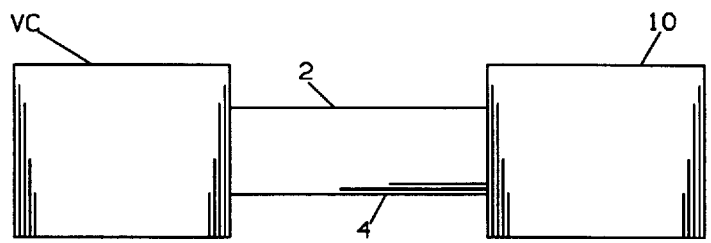
FIG. 10 is a schematic view of a verification controller coupled to a network termination unit.

Network termination unit 10, as shown in FIG. 10, is coupled to verification controller VC at a central office through tip and ring conductor 2 and 4 respectively. Referring to FIG. 1 of the drawings, network termination unit 10 made in accordance with a first embodiment of the invention comprises a low voltage circuit in the form of an integrate circuit U1 along with external components including a latching double pole relay K1 having first and second normally closed contacts K1a connected to a subscriber's tip and ring terminals T1, R1 (pins P4, P5) respectively and first and second normally open contacts K1b to be discussed below. Relay K1 is controlled by coil 12 connected to pins 4 (C+) and 1 (C−) of integrated circuit U1. The use of a relay is particularly advantageous in that it provides complete isolation between the driving circuitry of the relay and any voltages present in the communication line in a cost effective manner.

Unit 10 obtains its power directly from the communication line. Tip and ring terminals of the communication line, along with an earth ground terminal, are connected to circuit U1 through serially coupled capacitor C3, resistor R5; capacitor C6, resistor R13; and capacitor C7, resistor R14 respectively at pins 11 (ACT), 12 (ACR), and 8 (ACGND) forming an AC coupling to circuit U1. The values of these components are selected to maintain a high impedance path from the tip, ring and earth ground conductors to integrated circuit U1 in order to withstand any high voltage conditions. An AC voltage on tip conductor to ring conductor, tip conductor to earth or ring conductor to earth will allow an AC voltage to go through an internal six diode bridge (CR14–19, FIG. 2) steering current into a common node VDD2 to be discussed below. Node VDD2 is coupled internally to pin 2 (CAP1) of circuit U1 with a relatively large capacitor C1, e.g., 10uF, connected between pin 2 and pin 7 (GND). Capacitor C1 serves several functions to be discussed infra. This AC coupling network provides one of several ways of charging capacitor C1.

Typically, there is a voltage level of approximately 48 volts on the communication line; however, this level rises to a higher level during ringing, for example, 260 volts, and to far higher voltages as a result of induced voltages from lightning or the like, for example, up to 10,000 volts. The power supply must be able to withstand such high voltages and at the same time provide appropriate power for the low voltage integrated circuit U1. The power supply network comprises an external solid state switch, Field Effect Transistor (FET) Q2, and a portion of circuit U1. As will be discussed in greater detail below, circuit U1 controls switch Q2 reducing voltage to the integrated circuit to a selected level, e.g., 20 volts. In order to reduce cost and size, a 300 volt FET switch is used along with a surge protector U2 to provide greater than 300 volt over-voltage protection. Surge protector U2 is chosen having a voltage breakdown that is less than that of switch Q2, for example, 290 volts.

According to the preferred embodiment, surge protector U2 is a symmetrical transient voltage protector such as TISP4290F3D available from Texas Instruments Incorporated designed to protect two-wire telecommunications applications against transients caused by lightning strikes and AC power lines.

Tip, ring and earth conductors are all connected to switch Q2 via line 2 through respective source diodes CR4, CR5 and CR6 with surge protector U2 connected between line 2 and return diode CR1 for the tip conductor, CR9 for the ring conductor and CR3 as well as Darlington coupled, PNP transistors Q1, Q3 for the earth conductor. As will be explained below, transistors Q1, Q3 serve to switch integrated circuit U1 to earth when biased on by pin 9 (GNDON) during a selected portion of the diagnostic sequence.

Under normal operating conditions, i.e., when idle or not in the diagnostic mode, transistor Q2 is in a high impedance state so that the low voltage circuit U1 is completely transparent having no affect on the communication line. Upon receipt of a wake-up command through the AC coupling network described above, in the form of a high voltage AC trigger signal, capacitor C1 is charged by the AC signal in the communication line, if not already charged to a selected value. Transistor Q2 is turned on when the charge on capacitor C1 reaches the selected value to provide a low impedance DC charge path through pin 14 (VDD) of circuit U1 to quickly charge capacitor C1 to an appropriately high level to drive coil 12 and perform other functions to be discussed.

Figure 2:
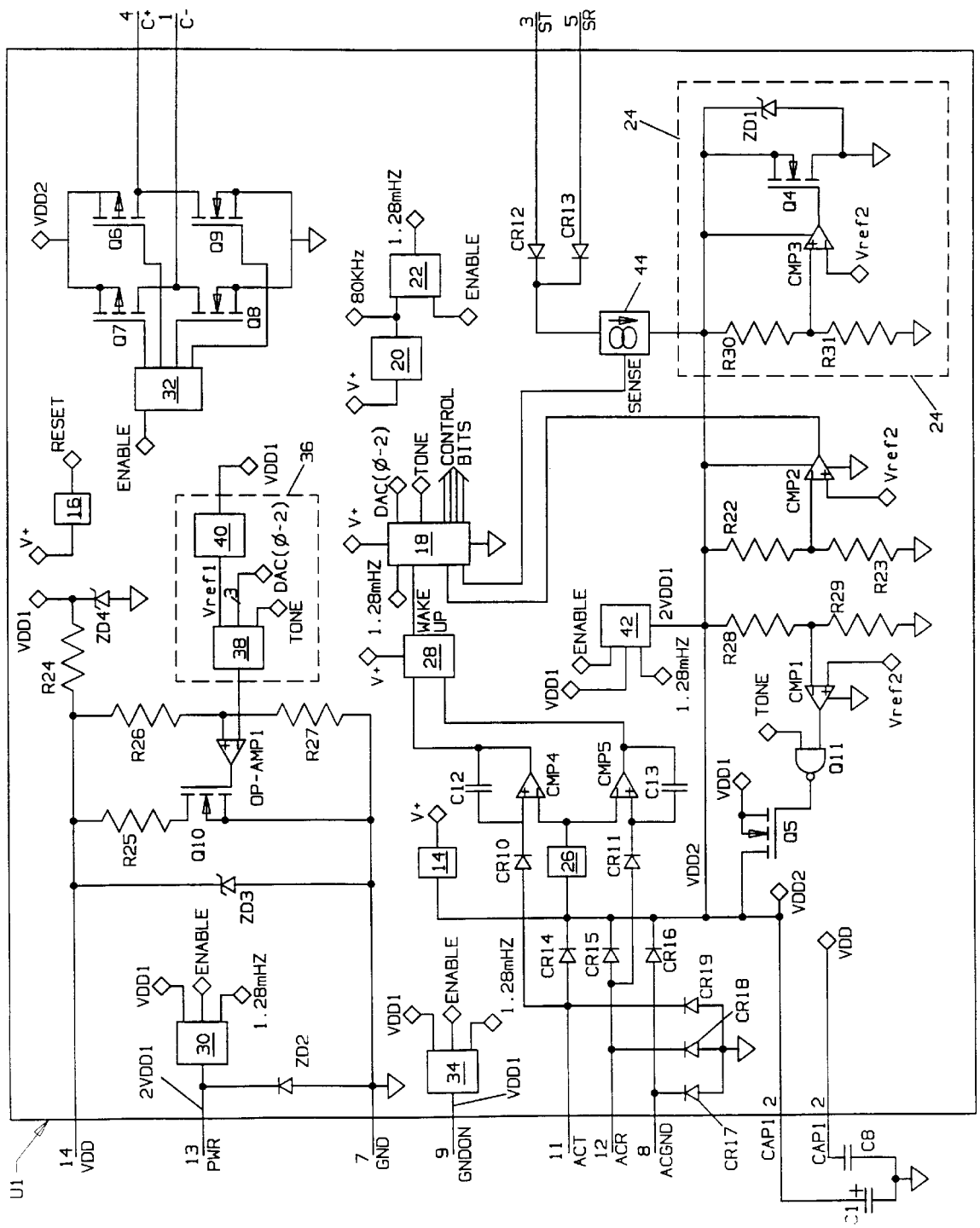
FIG. 2 is a schematic diagram of a low voltage, integrated circuit U1 shown in FIG. 1.

With particular reference to FIG. 2, a lead from node VDD2 extends to section 14, Logic Supply, which is an analog circuit which takes the VDD2 voltage and creates a voltage V+ used to power the logic portion of circuit U1. Voltage V+ is applied to section 16, Power on Reset Section. When voltage V+ reaches a selected threshold, circuit U1 will be reset with all the logic in the circuit powered up to a known, initial state, in a conventional manner. voltage V+ is also applied to section 18, ROM and Control Logic Section, which provides control bits, digital signals, for controlling various functions of the circuit to be discussed.

Voltage V+ also provides power for Oscillator Section 20 which serves as a master clock for the circuit to provide a selected frequency, e.g., 80 kHz to maintain the various functions of the circuit. PLL Section 22 receives the 80 kHz signal and, when enabled, provides a 1.28 mHz frequency signal for generating tone signals and for actuating charge pumps to be discussed.

The integrated circuit U1 is awakened when the voltage across C1 reaches a first level, e.g., 16 volts, determined by abort comparator CMP2. A voltage divider comprising resistors R22, R23 attached to line VDD2 is connected to the inverting input of comparator CMP2 with a reference voltage $V_{REF2}$ connected to the non-inverting input of the comparator. The output of abort comparator CMP2 is fed into ROM and Control Logic Section 18. When the voltage across capacitor C1 is above the first level the output of comparator CMP2 is low allowing section 18 to wake up the circuit. Whenever the voltage across capacitor C1 is below the first level the output of CMP2 is high providing an abort signal to prevent the signal from waking up and, if already engaged in a sequence of operations, will abort the sequence and connect the subscriber's T1 and R1 leads to the tip and ring conductors as will be explained below. On the other hand, if an AC signal on tip, ring or earth occurs which is higher than a selected high level, i.e., the voltage rating on capacitor C1, e.g., 25 volts, voltage regulator section 24 comprising comparator CMP3, FET Q4 and zener diode ZD1, maintains the voltage across capacitor C1 to a safe level, lower than the voltage rating of the capacitor.

The remaining functions of the integrated circuit U1 are powered by a VDD1 signal supplied from capacitor C1 through FET Q5 or from the external solid state switch, FET Q2 which is connected to the VDD pin of circuit U1 and through a resistor R24. FET Q2 is normally off so that the only way the integrated circuit U1 can receive power in that condition is by means of an AC signal through the AC coupling network described above. When the charge on capacitor C1 reaches a threshold level determined by level OK comparator CMP1, the comparator will switch allowing voltage to proceed to the remaining analog circuit. A reference voltage of $V_{REF2}$ is connected to the positive input of comparator CMP1 with the negative input connected to a voltage divider comprising resistors R28, R29 tied to the VDD2 line. The output of comparator CMP1 is connected to nand gate Q11 whose output is connected to the gate of transistor Q5.

In order to wake-up circuit U1 a unique AC trigger signal is sent on tip ring and earth leads which goes into a digitizing network comprising diodes CR10, CR11 which in turn are connected respectively to the positive inputs of tip comparator CMP4 and ring comparator CMP5. The negative inputs of both comparators are connected to section 26, a reference voltage $V_{REF2}$ obtained from VDD2. Capacitors C12 and C13 are connected respectively across the positive input and the output of the comparators to filter out high frequencies which might be present on tip, ring and earth. This network digitizes the AC signal and provides separate tip and ring digital pulses going into Wake-up Detect Logic Section 28.

The AC signal for waking up the unit is of a sufficiently high magnitude to supply power for the logic and at the same time is of a unique nature, in order to function efficiently in the presence of a voltage at 60 Hz which may be induced on the line. The present invention provides a modulation scheme to properly handle the presence of the induced 60 Hz voltage rather than high cost filtering techniques of the prior art. In accordance with the invention a signal having a selected, relatively low frequency, at a voltage level preferably 20% or more higher than the 60 Hz induced voltage, is sent out on the line. A frequency which is then detected within a first selected band below a 60 Hz centered band or within a second selected band above the 60 Hz centered band represents a logic "high" state while all other frequencies represent a logic "low" state. In a system made in accordance with the invention the first selected band is between approximately 23 and 56.6 Hz and the second selected band is between approximately 65.6 and 333 Hz with a trigger signal of approximately 97 Hz. The 97 Hz trigger signal is an optimized frequency based on harmonics of 60 Hz; however it will be understood that other frequencies selected within the first and second bands could be employed, if desired. The digitized signal goes from Wake-up Detect Logic Section 28 to ROM and Control Logic Section 18 to thereby wake-up the circuit from an idle, transparent state and initiate the selected sequence of events in order to diagnose the communication line.

Upon waking up, external switch, FET Q2, is turned on in order to quickly obtain sufficient voltage for circuit U1 to perform its functions. When switch Q2 is on DC voltage from source diodes CR4, CR5, CR6 is received on the VDD pin thereby powering the VDD, VDD1 leads in addition to charging capacitor C1. This is accomplished by the ROM and Control Logic Section 18 issuing an enable signal to energize positive charge pump 30 which doubles the VDD1 voltage and applies that voltage, pin 13 (PWR), to the gate of switch Q2. This provides sufficient voltage to fully power circuit U1.

Although various sequences can be performed, including a procedure in which unit 10 sends a signal on the communication line without disconnecting the subscriber in order to affirm its presence, the selected sequence is normally initiated by disconnecting the subscriber from the communication line through relay K1. Relay K1 is a low voltage relay requiring, for example, a minimum of 18 milliamps for 6 milliseconds for actuation. Coil 12 is energized through FET's Q6–Q9 arranged in an H bridge coupled to pins 4 (C+) and 1 (C−), the terminals of coil 12. The FET bridge is driven from the VDD2 voltage across capacitor C1 to ground when Relay Drive Control Section 32 is enabled by ROM and Control Logic Section 18. Coil 12 is driven causing relay K1 contacts K1a to open and K1b contacts to close. Capacitor C1 is rapidly recharged through switch Q2 from the DC voltage applied by the main office VC. If, for any reason, there is insufficient voltage across capacitor C1 and concomitantly at abort comparator CMP2, the enable signal will not be issued. Further, if the voltage level across capacitor C1 falls below the threshold level of comparator CMP2 at any time during the sequence, the sequence will be aborted, as will be further discussed below.

The next step in the sequence is for the circuit U1 to send a signal to the VC indicating that unit 10 has received the wake-up signal and the unit is present on the communication line. This is accomplished by applying a known ohmic termination across tip and ring and to earth simultaneously using FET Q10 and operational amplifier OP-AMP1. OP-AMP1 drives FET Q10 fully on creating a known low impedance path between VDD line and ground. A resistor R25 connected in series with FET Q10 maintains the DC voltage from VDD to ground. Resistors R26 and R27 form a voltage divider connected to the non-inverting input of OP-AMP1. The inverting input of OP-AMP1 is connected to Tone Generator Section 36 comprised of a digital to analog converter 38 and a reference voltage $V_{REF1}$ from $V_{REF}$ section 40. DAC 38 applies a selected DC voltage to OP-AMP1 to fully turn on FET Q10 to its lowest impedance state. From tip terminal P1 to ring terminal P2 the known impedance includes diode CR4, resistor R1, FET Q2, resistor R25, FET Q10 and diode CR9. An impedance is connected to earth ground by turning on Darlington coupled PNP transistors Q1, Q3 connected between GND pin 7 of circuit U1 and resistor R21, diode CR3 which in turn is connected to the earth ground terminal P3. Negative voltage −VDD1 is applied to the base of transistor Q3 by means of Negative Charge Pump Section 34 which has an input of −VDD1 derived from the external voltage on tip and ring and which is enabled by ROM and Control Logic Section 18 to create a voltage of −VDD1 using the 1.28 mHz clock. Thus the tip terminal to earth ground terminal includes diode CR4, resistor R1, FET Q2, resistor R25, FET Q10, Darlington transistors Q3, Q1, resistor R21 and diode CR3. Ring to earth includes diode CR5, resistor R1, FET Q2, resistor R25, FET Q10, transistors Q3, Q1, resistor R21 and diode CR3. The known resistance termination is applied for a selected duration, e.g., 250 milliseconds followed by no termination for 250 milliseconds and preferably a repeated known resistance termination for yet another 250 milliseconds in order to provide the VC with a unique signal so that the VC knows that unit 10 is on line. The duration of the known resistance termination pulse is also used by the verification controller as a pulse synchronization means in order to adjust its frequency to that of unit 10. The known resistance termination step also allows the VC to determine if any of the tip, ring and earth leads are open.

The next step in the sequence is to allow the VC to take a resistance measurement from tip to ring conductors. This is accomplished by turning off transistors Q1, Q3 and maintaining FET's Q2 and Q10 on. This termination is effected for a selected duration, e.g., 500 milliseconds, in order to allow the VC to take a tip to ring conductor DC measurement.

The next step in the sequence is to allow the VC to take a tip to earth ground resistance measurement. Transistors Q1 and Q3 are turned fully on along with transistors Q2 and Q10 for a selected duration, e.g., 500 milliseconds.

When this is completed the circuit is maintained in the same configuration allowing the VC to apply a DC voltage between ring to earth ground and perform a resistance measurement. From these three measurements, the VC can determine the amount of resistance between unit 10 and its earth ground lead, i.e., the earth rod driven into the ground at the subscriber's site.

Unit 10 then provides a tone signal on the tip and ring conductors. This is accomplished using the tone generator section 36 and driving a selected tone into operational amplifier OP-AMP1. During this procedure transistors Q1 and Q3 are maintained in the off state keeping the earth ground isolated from the tip and ring conductors. ROM and Control Logic Section 18 sends the tone signal through Tone Generator Section 36 and digital bits on DAC input leads DAC 0–2 creating a sine wave output from DAC 38 into OP-AMP1. This sine wave output drives FET Q10 which modulates the DC voltage VDD to GND applying a sine wave on the VDD and GND outputs. The tone signal is sent at a plurality of selected frequencies, e.g., 400 Hz, 1 kHz, 2.8 kHz, 4 kHz and 8 kHz. The first three frequencies correspond to the lower, middle and upper voice frequency range while the 80 kHz frequency is used to check the integrity of the communication line for high speed communications on the tip and ring conductors. These tones are sent for a selected duration, e.g., 500 milliseconds each.

After the tone signals are sent a noise termination is applied using the same configuration from tip to ring as described supra relative to the known resistance termination. In this termination the Q2 and Q10 transistors are turned on and transistors Q1 and Q3 are turned off for a selected interval, e.g., 5 or 6 seconds, to allow the VC to measure noise on the communication line.

The sequence is then completed with relay K1 being energized to reconnect normally closed contacts K1a. This is accomplished by applying a positive charge on the C− terminal of coil 12 and a negative voltage on the C+ terminal. Circuit U1 then powers down transistor Q2 and remains isolated from the line except for the AC coupling through capacitors, resistors C3, R5;l C6, R13; and C7, R14 respectively.

Although a specific sequence was described, it will be appreciated that the sequence can be modified, for example, by omitting one or more of the described test configurations as desired.

As mentioned supra, comparator CMP2 constantly monitors the voltage across capacitor C1 and, at any time during the sequence the charge across the capacitor falls below $V_{REF2}$, a signal is sent to the ROM and Control Logic Section 18 to abort the sequence and re-energize the coil to return the relay contacts K1a to their normally closed condition. In order to minimize this possibility, the supply of DC voltage to the capacitor is enhanced by keeping transistor Q2 on during the sequence. Further, an additional Positive Charge Pump Section 42 is provided having a VDD1 input which doubles the VDD1 voltage and applies the doubled voltage to capacitor C1. Positive Charge Pump Section 42 is energized whenever circuit U1 is awake thereby maximizing the voltage across capacitor C1. The reference voltage for abort comparator CMP2 is set at approximately 16 volts so the voltage input at pins VDD to GND of integrated circuit U1 can go as low as approximately 8 volts and Positive Charge Pump Section 42 will keep the circuit awake by doubling the voltage charge on capacitor C1.

It was also mentioned above that when relay K1 was energized, opening normally closed contacts K1a, that normally open contacts K1b were then closed. First and second contacts K1b are connected through respective high impedance, e.g., 4.7M ohms, resistors R19, R20 and diodes CR12, CR13 to Constant Current Section 44. Thus when the subscriber is disconnected from the communication line, tip and ring conductors are connected to Constant Current Section 44 through a high impedance path which feeds a constant current into the VDD2 line in order to charge capacitor C1. If circuit U1 has been awakened, ROM and Control Logic Section 18 will ignore the presence of the voltage on the SR and ST leads; however, if for any reason relay K1 is opened, i.e., contacts K1a open and contacts K1b closed and circuit U1 is not in a sequence, the sense signal from section 44 inputted to section 18 will allow current from section 44 to flow to capacitor C1 through the VDD2 line. As soon as the capacitor reaches a high enough voltage, transistor Q2 will be turned on providing a low impedance path to rapidly charge the capacitor to a level sufficient to drive the relay back to its reset or closed position. Thus the SR and ST network provides a safety feature for reconnecting the subscriber.

With regard to other components in FIG. 1 not previously described, zener diode ZD2 between PWR and GND pins prevent excessive voltage on the gate of FET switch Q2 while zener diode ZD3 between the VDD line and the GND pin limits the voltage that integrated circuit U1 is exposed to, e.g., 30 volts.

Resistor R24 in the VDD line serves to isolate the tone signal from the power supply while the zener diode ZD4 between VDD1 analog power supply and IC ground GND limits the voltage on VDD1.

Capacitor C8 connected between CAP2 pin and ground is used as a filter capacitor during the tone portion of the sequence.

Zener diode ZD1 across VDD2 line and ground is a high voltage zener used upon initially powering up capacitor C1 to provide high voltage across the capacitor whereas FET Q4 is used, as described above, in decreasing voltage below the diode ZD1.

Capacitor C2 connected between the gate of FET switch Q2 and GND ground is used as a filter capacitor to maintain a constant DC voltage on PWR pin 13.

Diode CR3 in series with transistors Q1, Q3 make the transistors function as a unidirectional switch preventing current to flow from the earth terminal to GND ground. Resistor R1 is a power resistor to absorb current on tip, ring and earth.

Capacitor C9, connected to the base of transistor Q3, provides surge protection for transistors Q1, Q3, turning the transistors on in the event of a surge so that the current can be conducted to earth through current limiting resistor R21. Although two bipolar transistors are employed for reasons of economy it will be understood that other switching means could be employed, if desired, such as a single P-channel FET.

A network termination unit made in accordance with the invention has the following external components:

| CR1 | DL 4007 | Q1 | CMPT A92 |
| CR3 | DL 4007 | Q2 | TN2130K1 |
| CR4 | DL 4007 | Q3 | CMPT A92 |
| CR5 | DL 4007 | K1 | T02E-L-9V |
| CR6 | DL 4007 | U2 | TISP4290F30 |
| CR9 | DL 4007 | R1 | 560 ohms |
| C1 | 10 uf | R5 | 51K ohms |
| C2 | .01 uf | R13 | 51K ohms |
| C3 | .047 uf | R14 | 51K ohms |

-continued

| C6 | .047 uf | R19 | 4.7M ohms |
| C7 | .047 uf | R20 | 4.7M ohms |
| C8 | 2.2 nF | R21 | 1K ohms |
| C9 | .01 uf | | |

Figure 3:
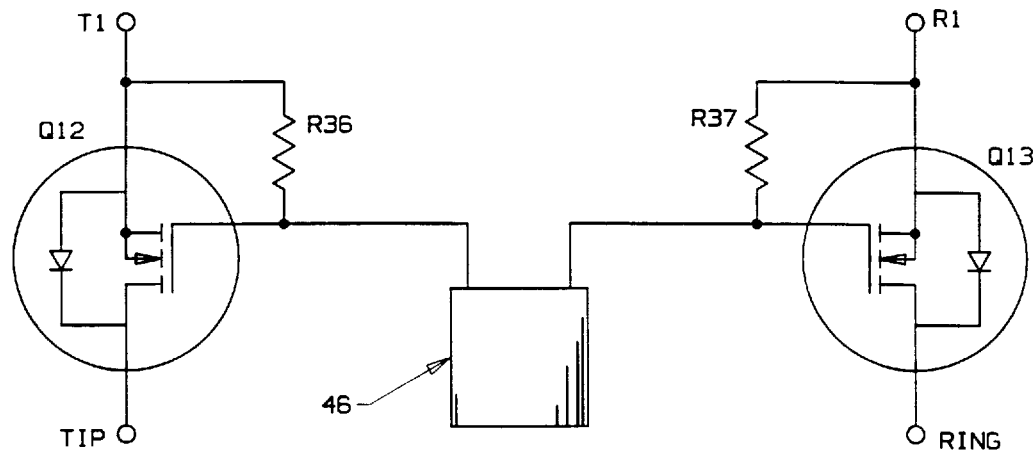
FIG. 3 is a schematic showing alternate series switches comprising depletion FET's.
Figure 4:
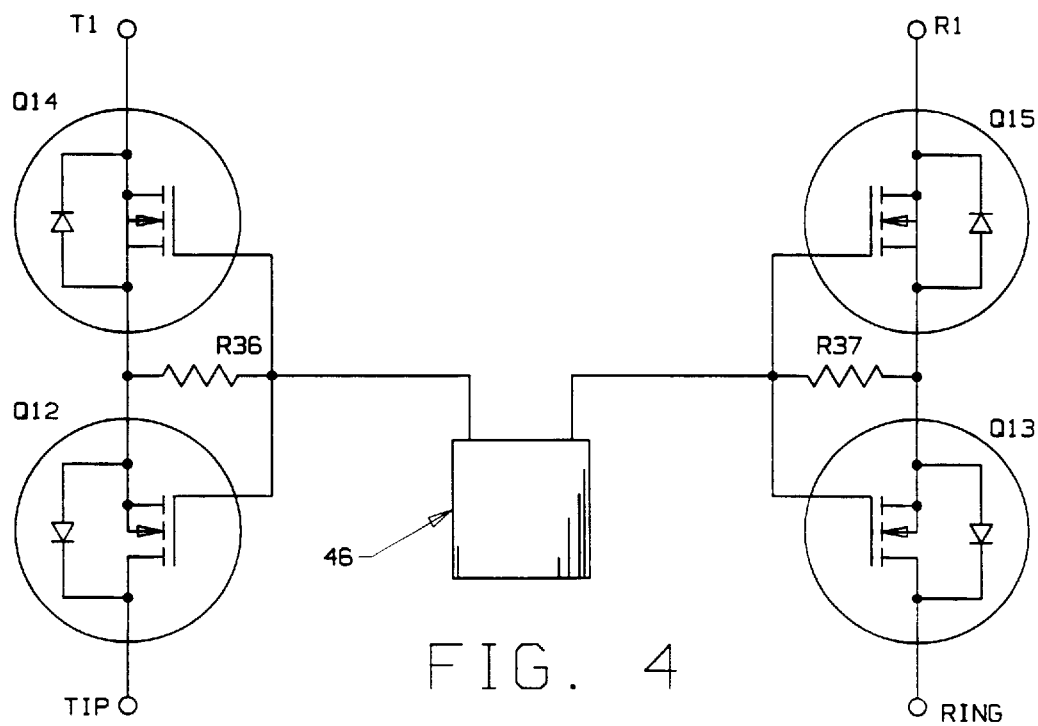
FIG. 4 is a schematic diagram, similar to FIG. 3, showing alternate series switches comprising two depletion FET's in series for each of the tip and ring conductors.

Although an electromechanical relay has been described in the embodiment of FIG. 1 for the series switches, solid state switches can also be used. With reference to FIG. 3, high voltage, low resistance, depletion FET's Q12, Q13 are serially connected to the tip and ring conductors respectively to serve as the series switches providing isolation for one polarity of the subscriber equipment. FET's Q12, Q13 are driven through series switch driver 46 connected to the bases of FET's Q12, Q13. Resistors R36, R37 provide a voltage potential from gate to source of FET's Q12, Q13 respectively. The use of two depletion FET's Q12, Q14 and Q13, Q15, respectively in series on both tip and ring as shown in FIG. 4 provide full isolation of the subscriber for both polarities.

Figure 6:
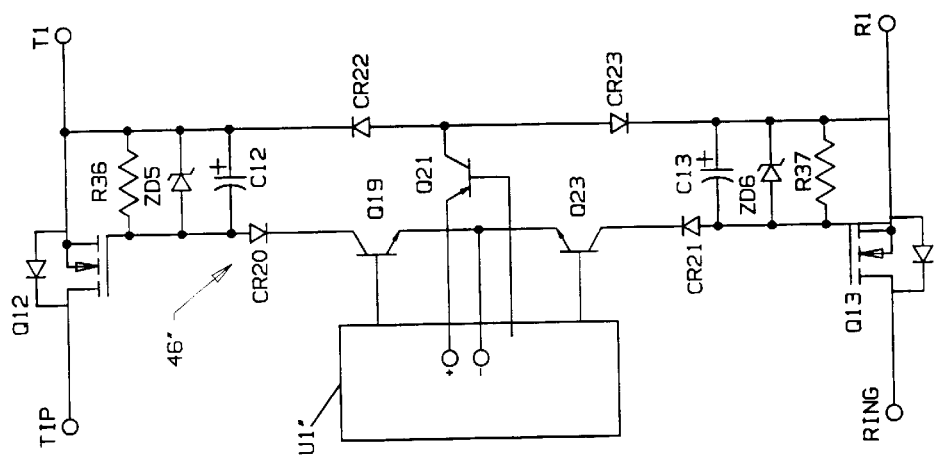
FIG. 6 is a schematic diagram, similar to FIG. 5, showing an alternate bipolar transistor drive circuit.
Figure 5:
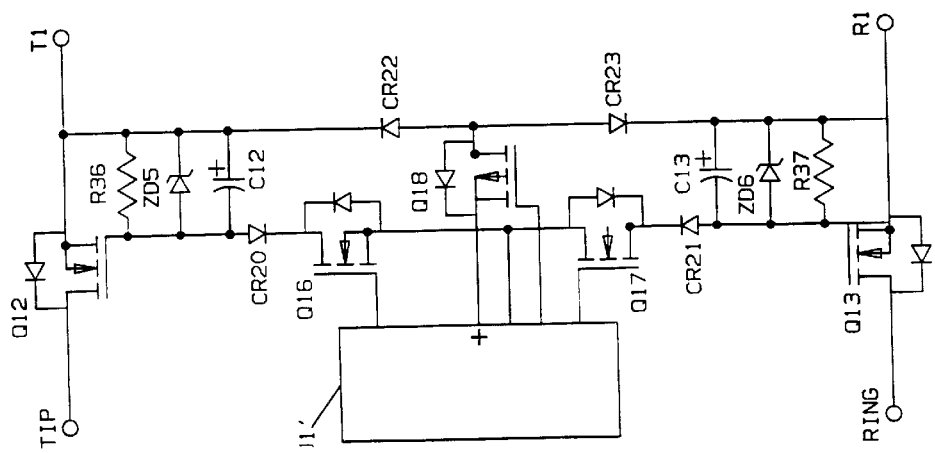
FIG. 5 is a schematic diagram, showing an alternate n-channel and p-channel enhancement MOSFET drive circuit.

FIG. 5 shows a drive circuit 46' coupled to circuit U1' with N-channel and P-channel enhancement MOSFETs Q16, Q17 and Q18 respectively. Zener diodes ZD5, ZD6 limit the voltage on the gate to source junction of respective FET's Q12, Q13 keeping the voltage below the maximum allowable voltage of the FET devices. Capacitors C12, C13 maintain the voltage potential on the respective gate and source terminals for a predetermined amount of time as well as filtering transients that are faster than the response time of zener diodes ZD5, ZD6. FET Q16 along with diode CR20 function as a unidirectional switch conducting from drain to source of FET Q16. FET Q17 along with diode CR21 similarly function as a unidirectional switch. Diodes CR22, CR23 allow P-channel FET Q18 to function as a unidirectional switch while also steering current on both tip and ring. FET Q18 is used to enable the positive potential on the sources of FET's Q12, Q13 so that upon actuation of FET Q18 a positive potential is switched from the positive terminal of the low voltage circuit U1' onto T1, R1, the respective sources of FET's Q12, Q13. While FIG. 6 shows a transistor driver circuit 46" coupled to circuit U1" which functions in the same manner as FIG. 5 but replaces FET's Q16, Q17 and Q18 with high voltage, low leakage bipolar NPN transistors Q19, Q20 along with NPN transistor Q21.

Figure 7:
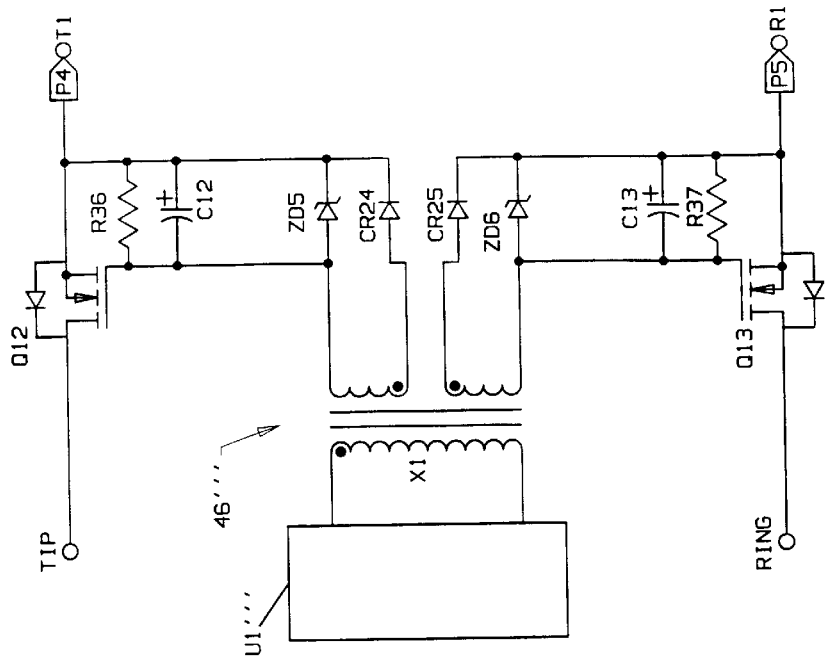
FIG. 7 is a schematic diagram, similar to FIG. 3, showing an alternate transformer drive circuit.

FIG. 7 shows a transformer drive 46'" coupled to circuit U1'" with transformer X1, which provides a completely floating bias, to depletion FET's Q12, Q13, Q12 keeping the gate to source voltage isolated from any voltage present on the network. Circuit U1'" provides an AC signal in the form of a square wave on the plus and minus terminals which is supplied to the primary of transformer X1 to create two independent voltages on the secondaries. These AC signals go through diodes CR24, CR25 respectively and charge capacitor C12 providing a positive source to gate voltage on FET Q12 and capacitor C13 providing a positive source to gate voltage on FET Q13.

Figure 8:
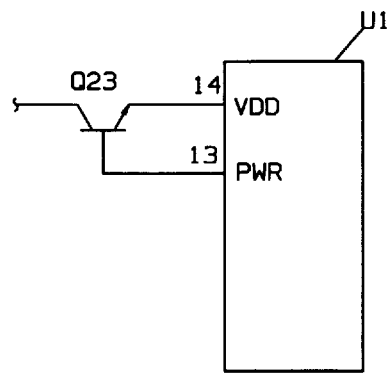
FIG. 8 is a schematic diagram showing a portion of an alternate power supply network for the low voltage circuit.

FIG. 8 shows a portion of an alternate power supply network in which high voltage npn bipolar transistor Q23 is deployed in place of high voltage n-channel MOSFET Q2. The PWR pin 13 of IC U1 performs the same function described supra relative to the FIGS. 1, 2 embodiment, i.e., that of providing a positive charge pump doubler sourced by the VDD signal.

Figure 9:
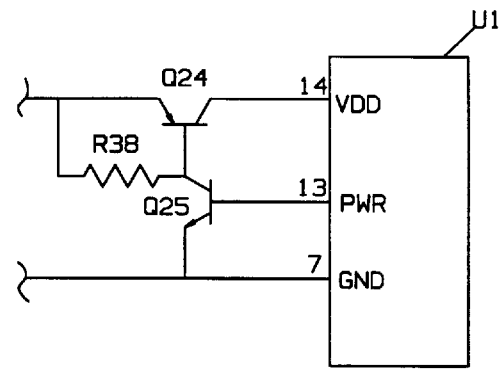
FIG. 9 is a schematic diagram similar to FIG. 8 showing a portion of another alternate power supply network.

Yet another alternate power supply network is shown in FIG. 9 in which a pnp bipolar transistor Q24 and an npn bipolar transistor Q25 are used in place of MOSFET Q2.

This arrangement provides several advantages including the fact that the voltage doubler on PWR pin 13 is not required. Further, transistor Q25 can be used as the termination ground switch in place of FET Q10. Operation is achieved by biasing on transistor Q25 with a positive DC voltage on PWR pin 13 with respect to GND pin 7. As transistor Q25 conducts transistor Q24 then conducts allowing DC current to flow into the VDD pin 14 to power up the low voltage circuit U1. Resistor R38, connected between the emitter and base of transistor Q24, ensures turn off of transistor Q24 once power is removed from pin 13 by discharging the base emitter junction.

Figure 11:
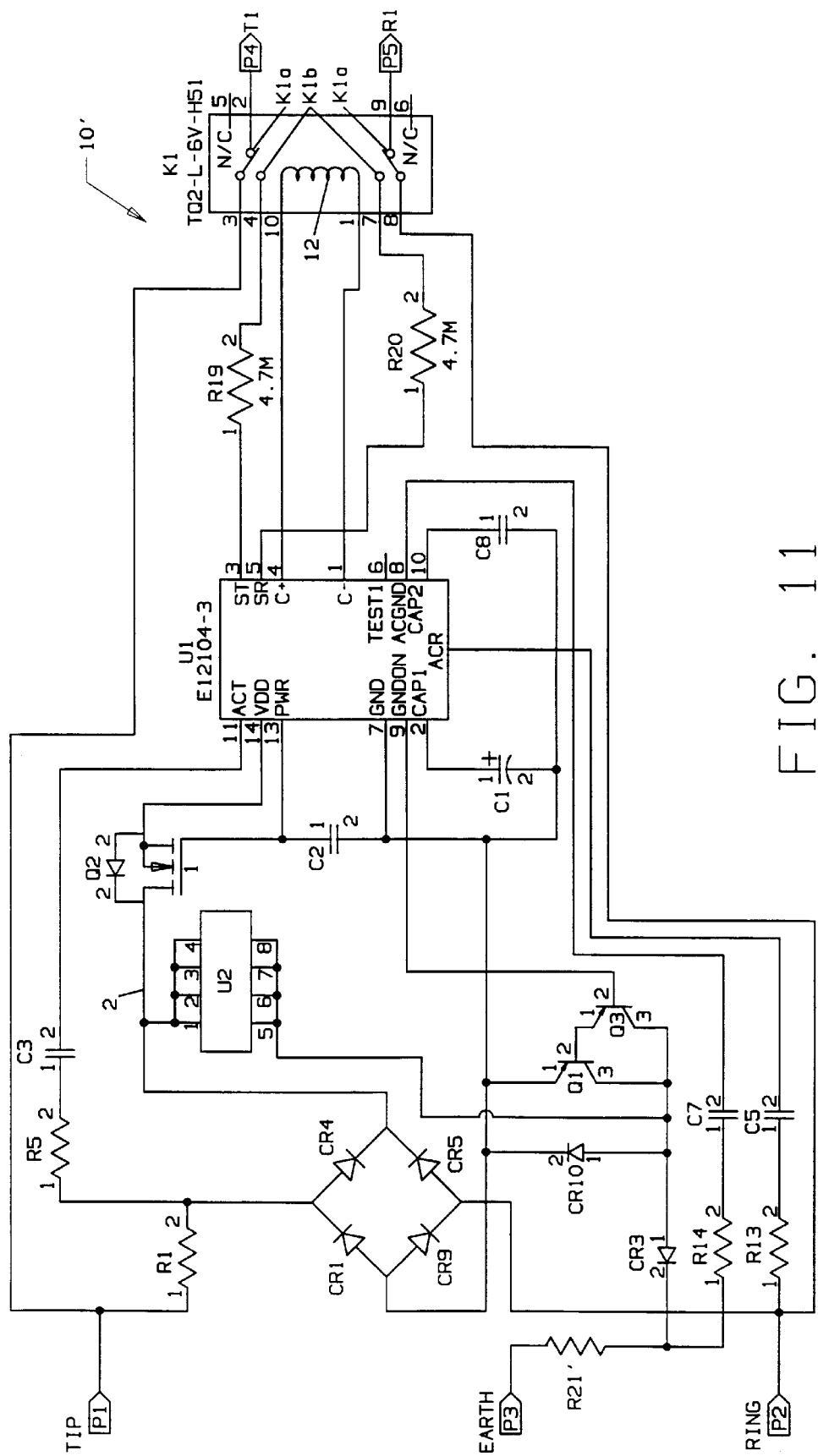
FIG. 11 is a schematic diagram, similar to FIG. 1, of a modified network termination unit made in accordance with the invention.

Another modified embodiment 10' of the FIG. 1 embodiment is shown in FIG. 11 which reduces possible noise from ground during the test mode of the network termination unit as well as increasing its surge handling capability. Diode CR6 whose anode is tied to earth ground and whose cathode is tied to the junction of the cathodes of CR4 and CR5 in FIG. 1 is eliminated in FIG. 11. To improve protection of transistors Q1, Q3 from transient surges, surge protector U2 is connected to the collectors of transistors Q1, Q3 with diode CR10 connected across the transistors to provide a path for current flow through protector U2 in the event of a transient. Resistor R1, a 560 ohm resistor is connected between the tip conductor and the diode bridge to provide limiting current for the diodes. Resistor R21', also a 560 ohm resistor is connected in series with the earth ground lead. The remainder of the circuit arrangement is the same as FIG. 1 and need not be further described.

Although the invention has been described with regard to certain specific preferred embodiments thereof, variations and modifications will become apparent to those skilled in the art. It is, therefore, the intent that the appended claims be interpreted as broadly as possible in view of the prior art to include all such variations and modifications.

What is claimed:

1. Apparatus for performing a diagnostic routine on a communication line extending from a central office to a remote location at a point of demarcation at a subscriber location, the communication line having first and second conductors, comprising:

first and second series switches for connection respectively to the first and second conductors, the series switches normally having a low impedance state and being switchable to a high impedance state, a series switch actuation circuit for switching the series switches, a shunt switch connected to the first and second conductors, the shunt switch normally having a high impedance state and being switchable to a low impedance state, a low voltage circuit connected to the first and second conductors for monitoring the communication line to sense the presence of a trigger signal and for initiating a diagnostic routine by switching the first and second switches to a high impedance state and sequentially switching the first and second conductors and an earth ground lead into a plurality of designated test configurations, a power supply section including a high voltage series regulator device serially connected to one of the first and second conductors and to the low voltage circuit to regulate supply voltage to the low voltage circuit to a selected low DC voltage, the high voltage series regulator device having a predetermined maximum voltage rating, an overvoltage protection circuit for suppressing overvoltages on the first and second conductors and the earth ground lead comprising a unidirectional surge protector having a breakover voltage less than the predetermined maximum voltage rating connected to the one of the first and second conductors and a diode bridge connected between the first and second conductors and the surge protector, the diode bridge comprising a source diode and a return diode connected respectively to each of the first and second conductors.

2. Apparatus according to claim 1 in which the low voltage circuit has a ground terminal and further comprising a solid state switch connected between the ground terminal and the earth ground lead.

3. Apparatus according to claim 2 in which the solid state switch includes a bipolar transistor.

4. Apparatus according to claim 3 further including means to turn on the bipolar transistor in the event that the biplar transistor is exposed to a transient voltage above a selected level.

5. Apparatus according to claim 1 in which the first and second series switches comprise a double pole relay having a coil connected to the low voltage circuit and having first and second normally closed switch contacts and being switchable between a normally closed state and an open state, the first and second normally closed switch contacts connected respectively to the first and second conductors to form a low impedance path to first and second subscriber conductors respectively when in the normally closed state and a high impedance path to the low voltage circuit and to form an open, high impedance path to the first and second subscriber conductors respectively when in the open state, the double pole relay switching from the normally closed state to the open state upon energization of the coil.

6. Apparatus according to claim 5 in which the relay is a latching relay and further including a charge storage device connected to the coil for providing actuating current to the coil.

7. Apparatus according to claim 6 further including a high impedance AC coupling network forming a first charge path from the communication line to the charge storage device.

8. Apparatus according to claim 6 further including a low impedance path extending from the high voltage series regulator device to the charge storage device forming a charge path so that the charge storage device can be charged through the high voltage series regulator device.

9. Apparatus according to claim 6 in which the relay in the open state closes first and second normally open contacts, the normally open contacts being connected to a high impedance path coupled to the charge storage device.

10. Apparatus according to claim 6 further including a monitoring circuit coupled to the charge storage device for monitoring the charge of the charge storage device and means for aborting a diagnostic routine and for turning on the high voltage series regulator device whenever the charge on the charge storage device falls below a selected minimum level.

11. Apparatus according to claim 1 in which the high voltage series regulator device comprises a high voltage FET.

12. Apparatus according to claim 1 in which the high voltage series regulator device comprises a high voltage bipolar transistor biased directly from the low voltage circuit.

13. Apparatus according to claim 1 in which the high voltage series regulator device comprises a first high voltage bipolar transistor having a base biased by a second bipolar transistor connected to the base, the second bipolar transistor being biased by the low voltage circuit.

14. Apparatus according to claim 1 in which the first and second series switches comprise FET's.

15. Apparatus according to claim 14 in which the series switch FET's are coupled to a bipolar transistor drive circuit.

16. Apparatus according to claim 14 in which the series switch actuation circuit includes an FET drive circuit.

17. Apparatus according to claim 14 in which the series switch actuation circuit includes a transformer drive circuit.

18. In a device for running a diagnostic routine on a communication line having a latching relay with contacts movable upon actuation by a coil between normally open and normally closed positions, the normally closed contacts connecting the tip and ring conductor of the communication line with the tip and ring terminals of a subscriber for performing the diagnostic routine using a high voltage series regulator connected to at least one of the tip and ring conductors upon receiving a trigger signal and a charge storage device coupled to the coil for providing current to actuate the relay, the method comprising the steps of providing a high impedance AC coupling between the tip and ring conductors and a ground conductor on one hand and the charge storage device on another hand to form a first charge path, when the charge storage device has charged sufficiently energizing the voltage series regulator to provide a second charge path comprising a low impedance DC path between the tip and ring conductors and the charge storage device after receiving a trigger signal to charge the charge storage device to a first selected level, monitoring the charge level of the charge storage device and anytime that the charge level decreases to a selected minimum level lower than the first selected level when the contacts are in the opened contacts position, aborting any diagnostic routine being conducted and actuating the relay from the contacts open position to the contacts closed position.

19. A method according to claim 18 further including the steps of coupling the normally opened contacts to a high impedance path to the charge storage device forming a third charge path and whenever the relay is in the normally open position and no trigger signal has been received allowing current to be conducted in the third charge path to charge the charge storage device sufficiently to energize the high voltage series regulator to charge the charge storage device to a sufficiently high level to actuate the relay to the normally closed position.

20. Apparatus according to claim 1 in which the series switch actuation circuit includes a charge storage device,
   a high impedance AC charge path continuously coupling the first and second conductors to the charge storage device, and
   a low impedance DC path charge path selectively coupling one of the first and second conductors to the charge storage device.

21. Apparatus for performing a diagnostic routine on a communication line extending from a central office to a remote location at a point of demarcation at a subscriber location, the communication line having tip and ring conductors, comprising:
   a low voltage circuit having a ground, the low voltage circuit connected to ring and tip conductors for monitoring the communication line to sense the presence of a trigger signal and for initiating a diagnostic routine including sequentially switching tip conductor, ring conductor and an earth ground lead into a plurality of designated test configurations,
   a power supply section including a high voltage FET serially connected to one of the tip and ring conductors and to the low voltage circuit to regulate supply voltage to the low voltage circuit to a selected low DC voltage,
   a switch connected between the ground of the low voltage circuit and an earth ground terminal for selectively providing a low impedance path therebetween and a low voltage FET in the low voltage circuit serially connected to the high voltage FET for providing, along with the switch, two direction termination for each of the tip conductor, ring conductor and earth ground lead.

22. Apparatus according to claim 21 in which the switch connected between the ground of the low voltage circuit and the earth ground lead comprises Darlington connected transistors.

23. Apparatus for interfacing with a communication line extending from a central office to a remote location at a point of demarcation at a subscriber location, the communication line having first and second conductors, comprising:
   a low voltage circuit connected to the first and second conductors for monitoring the communication line to sense the presence of a trigger signal and for sending selected signals on the communication line in response to said trigger signal,
   a power supply section including a high voltage series regulator device serially connected to one of the first and second conductors and to the low voltage circuit to regulate supply voltage to the low voltage circuit to a selected low DC voltage,
   an earth ground lead, a diode bridge connected between the first and second conductors and the power supply section, the diode bridge comprising a diode and a return diode connected respectively to each of the first and second conductors, first and second series switches for connection respectively to the first and second conductors and a series switch actuation circuit including a charge storage device,
   a high impedance AC charge path continuously coupling the first and second conductors to the charge storage device, and
   a low impedance DC charge path selectively coupling one of the first and second conductors to the charge storage path.

24. Apparatus according to claim 23 in which the high voltage series regulator device has a maximum voltage rating and further including an overvoltage protection circuit for suppressing overvoltages on the first and second conductors and the earth ground lead comprising a unidirectional surge protector having a breakover voltage less than the said predetermined maximum voltage rating connected to the said one of first and second conductors.

25. Apparatus according to claim 23 in which the low voltage circuit has a ground terminal and further comprising a solid state switch connected between the ground terminal and the earth ground lead.

26. Apparatus according to claim 24 in which the solid state switch includes a bipolar transistor.

27. Apparatus according to claim 25 further including means to turn on the bipolar transistor in the event that the bipolar transistor is exposed to a transient voltage above a selected level.

28. Apparatus according to claim 23 further including first and second series switches for connection respectively to the first and second conductors, the series switches normally having a low impedance and being switchable to a high impedance, the first and second series switches comprising a double pole relay having a coil connected to the low voltage circuit and having first and second normally closed switch contacts and being switchable between a normally closed state and an open state, the first and second normally closed switch contacts connected respectively to the first and second conductors to form a low impedance path to first and second subscriber conductors respectively when in the normally closed state and a high impedance path to the low voltage circuit and to form an open, high impedance path to the first and second conductors respectively when in the open state, the double pole relay switching from the normally closed state to the open state upon energization of the coil.

29. Apparatus according to claim 28 in which the relay is a latching relay and further including a charge storage device connected to the coil for providing actuating current to the coil.

30. Apparatus according to claim 29 further including a high impedance AC coupling network forming a first charge path from the communication line to the charge storage device.

31. Apparatus according to claim 29 further including a low impedance path extending from the high voltage series regulator device to the charge storage device forming a charge path so that the charge storage device can be charged through the high voltage series regulator device.

32. Apparatus according to claim 29 in which the relay in the open state closes first and second normally open contacts, the normally open contacts being connected to a high impedance path coupled to the charge storage device.

33. Apparatus according to claim 23 in which the high voltage series regulator device comprises a high voltage FET.

34. Apparatus according to claim 23 in which the high voltage series regulator device comprises a high voltage bipolar transistor biased directly from the low voltage circuit.

35. Apparatus according to claim 23 in which the high voltage series regulator device comprises a first high voltage bipolar transistor having a base biased by a second bipolar transistor connected to the base, the second bipolar transistor being biased by the low voltage circuit.

36. Apparatus according to claim 23 further comprising first and second series switches for connection respectively to the first and second conductors, the first and second series switches comprising FET's.

37. Apparatus according to claim 36 in which the series switch FET's are coupled to a bipolar transistor drive circuit.

38. Apparatus according to claim 36 further comprising an FET drive circuit for the first and second series switches.

39. Apparatus according to claim 36 further comprising a transformer drive circuit for the first and second series switches.

40. Apparatus for performing a diagnostic routine on a communication line extending from a central office to a remote location at a point of demarcation at a subscriber location, the communication line having first and second conductors, comprising:

first and second series switches for connection respectively to the first and second conductors, the series switches normally having a low impedance state and being switchable to a high impedance state, a series switch actuation circuit for switching the series switches, a shunt switch connected to the first and second conductors and to an earth ground lead, the shunt switch normally having a high impedance state and being switchable to a low impedance state, a low voltage circuit connected to the first and second conductors for monitoring the communication line to sense the presence of a selected AC trigger signal and being responsive to the selected AC trigger signal by sending a selected response signal on the communication line, the selected AC trigger signal being based on a modulation scheme in which the detection of a signal having a frequency in one of a first selected band below 60 Hz and a second selected band above 60 Hz represents a logic "high" state with all other frequencies representing a logic "low" state.

41. Apparatus according to claim 40 in which the selected response signal is a serial identification code.

42. Apparatus according to claim 40 in which the selected response signal is the result of a diagnostic routine.

43. Apparatus according to claim 41 in which the first selected band is between approximately 23 and 56.5 Hz, the second selected band is between approximately 65.5 and 333 Hz and the trigger signal is approximately 97 Hz.

44. Apparatus for performing a diagnostic routine on a communication line extending from a central office to a remote location at a point of demarcation at a subscriber location, the communication line having first and second conductors, comprising:

first and second series switches for connection respectively to the first and second conductors, the series switches normally having a low impedance state and being switchable to a high impedance state, a series switch actuation circuit for switching the series switches, a shunt switch connected to the first and second conductors and to an earth ground lead, the shunt switch normally having a high impedance state and being switchable to a low impedance state, a low voltage circuit connected to the first and second conductors for monitoring the communication line to sense the presence of a selected AC trigger signal and being responsive to the selected AC trigger signal by sending a selected response signal on the communication line, the low voltage circuit being coupled to each of the first and second conductors and to the earth ground lead through a respective serially connected resistor and capacitor.

* * * * *